United States Patent
Mello

(10) Patent No.: US 9,826,685 B2
(45) Date of Patent: Nov. 28, 2017

(54) VERTICAL ROLLER DEVICE TO AID IN FEEDING SUGAR CANE STALK TO HARVESTER

(71) Applicant: CNH Industrial America LLC, New Holland, PA (US)

(72) Inventor: Maurilio O. Mello, Ribeirão Preto (BR)

(73) Assignee: CNH INDUSTRIAL AMERICA LLC, New Holland, PA (US)

( * ) Notice: Subject to any disclaimer, the term of this patent is extended or adjusted under 35 U.S.C. 154(b) by 0 days.

(21) Appl. No.: 14/776,383

(22) PCT Filed: Mar. 13, 2014

(86) PCT No.: PCT/BR2014/000077
§ 371 (c)(1),
(2) Date: Oct. 28, 2015

(87) PCT Pub. No.: WO2014/138834
PCT Pub. Date: Sep. 18, 2014

(65) Prior Publication Data
US 2016/0150730 A1 Jun. 2, 2016

(30) Foreign Application Priority Data
Mar. 14, 2013 (BR) .......................... 1020130069825

(51) Int. Cl.
*A01D 57/01* (2006.01)
*A01D 45/10* (2006.01)

(52) U.S. Cl.
CPC ............. *A01D 57/01* (2013.01); *A01D 45/10* (2013.01)

(58) Field of Classification Search
CPC ...... A01D 57/01; A01D 45/10; A01D 43/082; A01D 41/06
(Continued)

(56) References Cited

U.S. PATENT DOCUMENTS 3,791,114 A * 2/1974 Fowler .................. A01D 45/10
56/13.9
3,919,830 A * 11/1975 Gerber ................ A01D 43/082
56/119
(Continued)

FOREIGN PATENT DOCUMENTS

AU 1440466 A 5/1968
BR PI0706022 A 9/2008
(Continued)

*Primary Examiner* — John G Weiss
(74) *Attorney, Agent, or Firm* — Peter K. Zacharias; Patrick M. Sheldrake

(57) ABSTRACT

The present invention refers to vertical roller devices to assist the supply of stems to sugar cane harvester, which are installed on the front side (A) of the harvester, fastened to the row dividers and which work in pairs, with elements on the right and on the left, which can consist of one or more pairs. The devices are designed to continuously propel and to guide the sugar cane stems to the inside of the harvester. The devices with vertical rollers (6) are formed by hydraulic motors (6a), finned cylinders (6b), upper fixing support members (6c) and lower fixing support members (6d). In the case of a single row, the devices are installed in the harvesters in accordance with to (B) and, in the case of two or more rows, in accordance with (C) on the inner faces (2) of the row dividers. The distance between the elements of the respective pairs decreases from the front to the inside of the harvester, guaranteeing continuous directional pressure on the cane mass as the vertical roller devices convey the cut canes towards the inside of the harvester, eliminating the jamming of stems, and maintaining a constant flow in the front part of the harvester and a consequent increase in harvest yield.

7 Claims, 3 Drawing Sheets

(58) Field of Classification Search
USPC .................................................. 56/14.5, 119
See application file for complete search history.

(56) References Cited

U.S. PATENT DOCUMENTS

| | | | |
|---|---|---|---|
| 4,329,832 A * | 5/1982 | Pietschmann | A01D 43/082 56/119 |
| 4,386,492 A * | 6/1983 | Tilby | A01D 45/10 56/13.9 |
| 4,483,130 A * | 11/1984 | Duncan | A01D 45/10 198/304 |
| 4,722,174 A | 2/1988 | Landry et al. | |
| 5,303,533 A * | 4/1994 | Caillouet | A01D 45/10 198/304 |
| 5,379,577 A | 1/1995 | Caillouet | |
| 5,379,578 A * | 1/1995 | Landry | A01D 45/10 56/14.5 |
| 6,032,444 A * | 3/2000 | Herron | A01D 43/082 56/102 |
| 7,028,458 B2 * | 4/2006 | Bruening | A01D 43/082 56/51 |
| 8,984,850 B2 * | 3/2015 | Lawson | A01D 45/003 56/13.9 |
| 2005/0109001 A1 * | 5/2005 | Wolters | A01D 57/22 56/16.4 R |

FOREIGN PATENT DOCUMENTS

| | | |
|---|---|---|
| CN | 1226371 A | 8/1999 |
| CN | 101305664 A | 11/2008 |
| CN | 102640621 A | 8/2012 |
| EP | 1543714 A2 | 6/2005 |

* cited by examiner

VERTICAL ROLLER DEVICE TO AID IN FEEDING SUGAR CANE STALK TO HARVESTER

TECHNICAL FIELD

The present patent application refers to an innovative system of rotatable vertical roller devices applicable in sugar-cane harvesters for assisting in supplying stems to the inner portion of the harvesters. The devices can be used to improve the performance of both ordinary single row harvesters and two or more rows harvesters. For conventional single row harvester, the present invention is designed for accommodating and conveying the sugar cane not yet cut to the base cutter disks; while the two or more rows harvester of the present invention are designed for conveying the stems to the inner portion of the harvester after being cut by the side cutting disks.

Thus, the supplying flow is non-stop for all types of harvesters, thus preventing the accumulation of plant mass in front of the harvester and promoting greater productivity per displacement during harvesting.

STATE OF THE ART

The front side of the harvesters usually presents conical rotating cylinders with spirals assisting in the process of sugar cane stem harvesting. These cylinders have the function of dividing the sugar cane rows before the stems are cut by the forward movement of the harvester along with the cylinder rotation. As for two or more rows harvesters, the external rows are cut by independent side disks that while rotating hurl the stems towards the central disks. The independent side disks are plain or have flaps installed on their surface and/or installed on their rotary axes and propel the stems into the harvester by friction and/or by the centrifugal force of their rotations. The conveyance and placement of the sugar cane stems in the harvesters are accomplished by means of horizontal rollers having several surface shapes such as flat or corrugated fins, with spirals, among others.

Technical Problems

The systems existing in the front side of the harvesters for two or more rows do not efficiently convey the sugar cane stems to the inner part of the harvester after cutting, hindering the harvest and generating losses or accumulation of plants in front of the harvester, causing excessive maneuvers and reversals.

As for single row harvesters, when the sugar cane crop is difficult to harvest due to high productivity, high amount of stem interlacing and increased fiber hardness, the canes form tangles in front of the harvester further causing excessive losses and maneuvers during the harvesting process.

Proposed Solution

The herein presented vertical roller devices for assisting in supplying stems in sugar cane harvesters aim at ensuring a continuous supply of stems in the front side of the harvesters. The devices propel the sugar cane stems into the harvester, thus avoiding the accumulation of cut stems or of those still to be cut, providing a harvest with higher performance and a smaller loss of raw material, both in sugar cane plantation having upright and tortuous stems, regardless of its density or productivity.

The devices will be installed through a suitable fastening system on each front side cutting disk in harvesters for two or more sugar cane rows. As for single row harvesters, the devices must be installed on the inner side of the central base-cutting disks.

DESCRIPTION OF THE DRAWINGS

The vertical roller devices to assist the supply of stems in sugar cane harvesters will be better disclosed according to the attached drawings, wherein.

DETAILED DESCRIPTION

Figure 1:
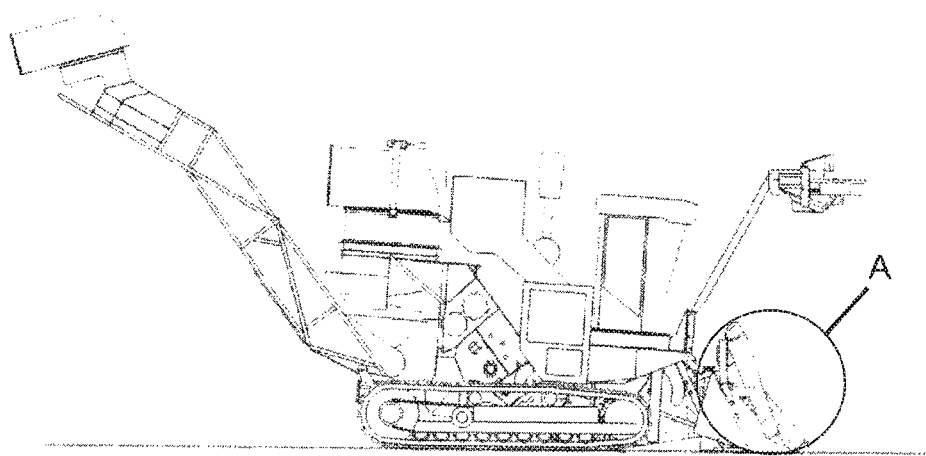
FIG. 1 shows the side view of a sugar cane harvester with the indication A in the front side where the vertical roller devices will be installed.
Figure 2:
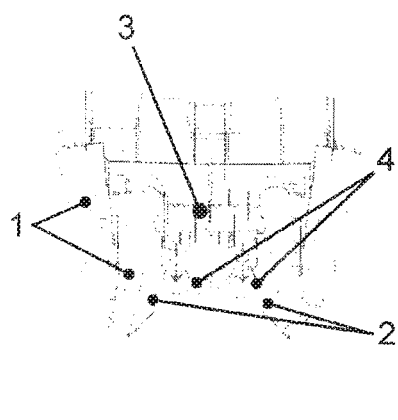
FIG. 2 shows the front view of a conventional single row sugar cane harvester.
Figure 3:
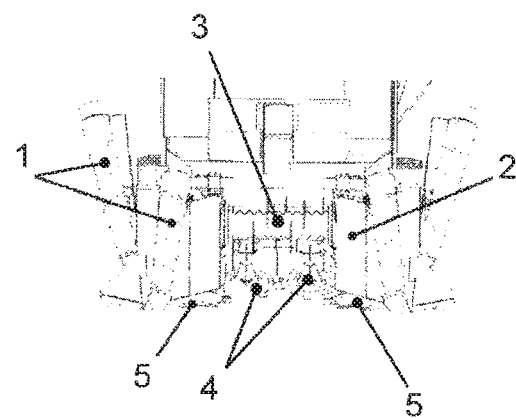
FIG. 3 shows the front view of a two or more rows sugar cane harvester.
Figure 4:
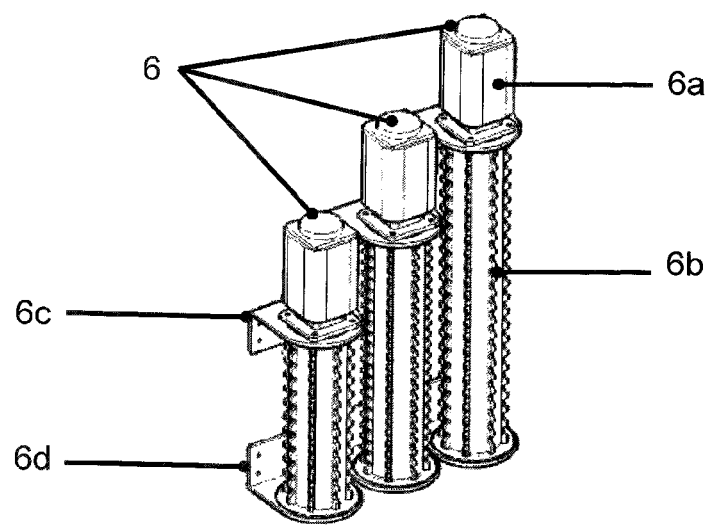
FIG. 4 is a perspective view showing a set of vertical roller devices for assisting in supplying stems in sugar cane harvesters.

The vertical roller devices for assisting in supplying stems to sugar cane harvester are installed on the rear side A of the harvester, fastened to the row divider which work in pairs, with elements on the right and on the left, which can be one or more pairs. The distance between the elements of the respective pairs decreases from the front to the inside of the harvester, ensuring a directional pressure on the cane mass as the vertical roller devices convey the cut canes into the harvester. The lengths of the vertical rollers are sized so as to be accommodated starting from the bottom end of the inner faces of the row dividers 2, between the conical cylinder with spirals 1 and the central cutting disks 4, and with diameters compatible with the rollers of the sugar cane harvesters.

Vertical rolling devices 6 boost the mechanisms of sugar cane stem front supply which already exist in the harvesters, such as rotating cylinders with conical spirals 1, horizontal roller 3 and central base cutting disk 4 in the case of a single row harvester. As for harvester for two or more rows, side base cutting disks 5 also exist.

Figure 5:
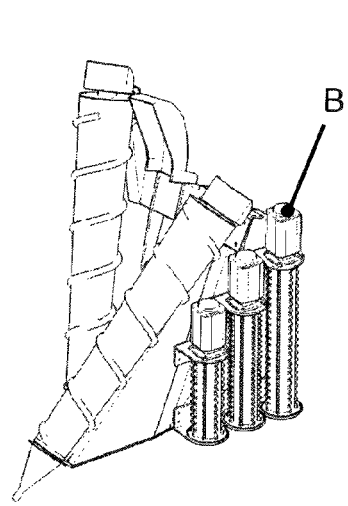
FIG. 5 shows a perspective view of a side set of vertical roller devices installed in a row divider of a conventional single row sugar cane harvester.
Figure 6:
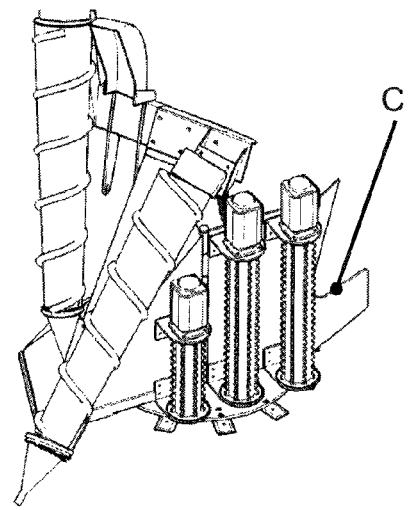
FIG. 6 shows a perspective view of a side set of vertical roller devices installed in a row divider of a sugar cane harvester for two or more rows.
Figure 7:
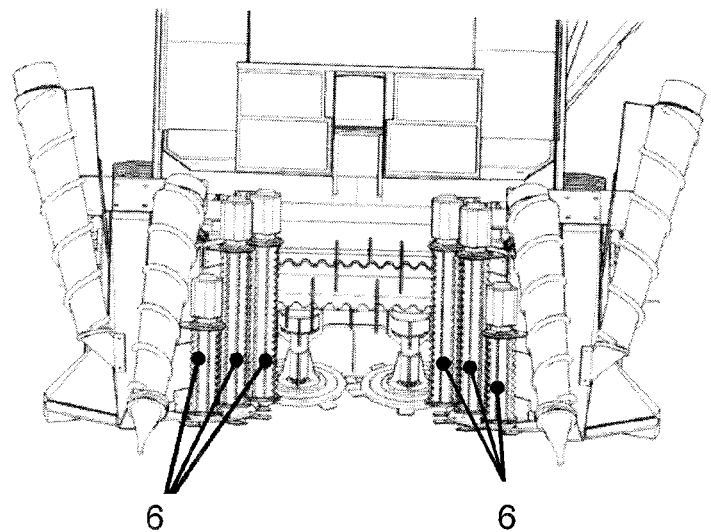
FIG. 7 shows a front view of the vertical roller devices of a sugar cane harvester for two or more rows.
Figure 8:
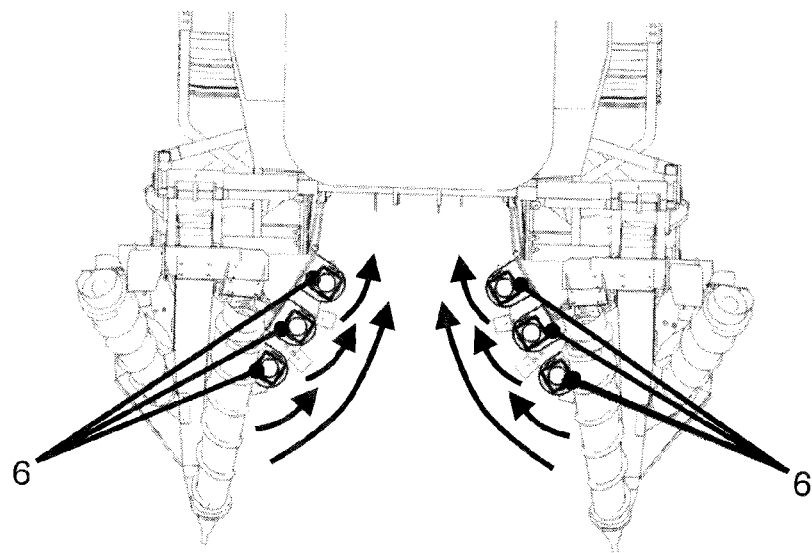
FIG. 8 is a top view of the vertical roller devices installed in sugar cane harvester for two or more rows.

The presented vertical roller devices for assisting in supplying stems in a sugar cane harvester consist of the set of mechanism 6, comprising hydraulic motor elements 6a, finned cylinders 6b, topside fastening bracket 6c and bottom-side fastening bracket 6d. The devices are fastened to one-row harvesters according to what is indicated under B in FIG. 5; as for harvesters for two or more rows the devices are installed according to what is indicated under C in FIG. 6, on both sides of the inner faces 2 of the row dividers.

Obviously, although the foregoing has been described as an example of this patent application, all other modifications and variations made to this application which will be clear to those skilled in the art are considered to be within the broad scope of this application.

The invention claimed is:

1. A sugar cane harvester comprising:
   at least one row divider having an inside surface;
   at least one vertical roller device for assisting in drawing stems into the sugar cane harvester, the at least one vertical roller device mounted to the inside surface of the at least one row divider;
   at least one base cutting disk mounted behind a frontmost one of the at least one vertical roller device; and
   at least one side base cutting disk mounted below the at least one row divider and forward of the at least one base cutting disk.

2. The sugar cane harvester of claim 1, further comprising at least one hydraulic motor coupled to the at least one vertical roller device for powering the at least one vertical roller device.

3. The sugar cane harvester of claim 1, wherein each of the at least one vertical roller device is a finned cylinder.

4. A sugar cane harvester comprising:
   a first row divider having an inside surface;
   a second row divider having an inside surface;
   at least one first vertical roller device for assisting in drawing stems into the sugar cane harvester, the at least one first vertical roller device mounted to the inside surface of the first row divider;
   at least one second vertical roller device for assisting in drawing the stems into the sugar cane harvester, the at least one second vertical roller device mounted to the inside surface of the second row divider;
   a pair of base cutting disks mounted behind the at least one first vertical roller device and the at least one second vertical roller device;
   a first side base cutting disk mounted below the first row divider and forward of the pair of base cutting disks; and
   a second side base cutting disk mounted below the second row divider and forward of the pair of base cutting disks.

5. The sugar cane harvester of claim 4, further comprising at least one first hydraulic motor coupled to the at least one first vertical roller device for powering the at least one first vertical roller device.

6. The sugar cane harvester of claim 4, further comprising at least one second hydraulic motor coupled to the at least one second vertical roller device for powering the at least one second vertical roller device.

7. The sugar cane harvester of claim 4, wherein each of the at least one first vertical roller device and the at least one second vertical roller device is a finned cylinder.

* * * * *